(12) United States Patent
Yee et al.

(10) Patent No.: US 6,771,212 B1
(45) Date of Patent: Aug. 3, 2004

(54) GPS RECEIVER WITH RECALIBRATION AND METHODS FOR RECALIBRATING AND RECONFIGURING A GPS RECEIVER

(75) Inventors: David Moon Yee, Scottsdale, AZ (US); Clinton Charles Hepner, Chandler, AZ (US); Jeffrey Dean York, Gilbert, AZ (US); Mark Chester Stange, Scottsdale, AZ (US); Howard George Varner, Jr., Mesa, AZ (US); Dave Richard Wallis, Phoenix, AZ (US)

(73) Assignee: General Dynamcis Corporation, Scottsdale, AZ (US)

(*) Notice: Subject to any disclaimer, the term of this patent is extended or adjusted under 35 U.S.C. 154(b) by 0 days.

(21) Appl. No.: 10/644,167

(22) Filed: Aug. 19, 2003

(51) Int. Cl.[7] .............................................. H04B 7/185
(52) U.S. Cl. .............................. 342/357.06; 342/357.12
(58) Field of Search ...................... 342/357.06, 357.12, 342/165, 174; 701/213

(56) References Cited

U.S. PATENT DOCUMENTS 6,662,107 B2 * 12/2003 Gronemeyer ............... 701/213

2003/0128157 A1 * 7/2003 Salkhi ................... 342/357.06

\* cited by examiner

*Primary Examiner*—Dao Phan
(74) *Attorney, Agent, or Firm*—Ingrassia Fisher & Lorenz, P.C.

(57) ABSTRACT

A method of recalibrating a Global Positioning System (GPS) receiver includes applying a first control signal to an oscillator for generation of an oscillator signal having an initial frequency and determining if an indicator of correct oscillator output frequency is present at the initial frequency. If an indicator of correct oscillator output frequency is not present, then iterative steps are followed until an indicator of correct oscillator output frequency is found. The iterative steps include: applying a new adjusted control signal to the oscillator for generation of a new frequency; determining whether an indicator of correct oscillator frequency is present; and if an indicator of correct oscillator output frequency is present with the oscillator having the new frequency, storing said adjusted control signal. If an indicator of correct oscillator frequency is present with the oscillator output signal having said initial frequency, then storing said initial control signal.

34 Claims, 4 Drawing Sheets

GPS RECEIVER WITH RECALIBRATION AND METHODS FOR RECALIBRATING AND RECONFIGURING A GPS RECEIVER

TECHNICAL FIELD

The present invention generally relates to a Global Positioning System (GPS) receiver and more particularly to recalibration of a GPS receiver.

BACKGROUND

GPS receivers have local oscillators or oscillators that are used in a heterodyne or superheterodyne configuration for acquiring GPS satellite signals. The center frequency of the oscillator is typically determined by a controller, which uses a control signal calibrated to produce an oscillator output signal with an appropriate frequency for acquisition of one or more GPS satellite signals. GPS receivers generally search a window (e.g., +/−80 Hertz (Hz)) or band of frequencies centered on the center frequency.

Typically, a GPS receiver recalibrates the relationship between the control signal and the oscillator output signal each time the receiver successfully acquires a three-dimensional (3-D) position fix. Acquiring a 3-D position fix generally includes acquiring GPS satellite signals from four (4) GPS satellites. Therefore, acquisition of a 3-D position fix is an acceptable indicator that the frequency of the oscillator output signal is correct and also that the control signal producing the frequency of the oscillator output signal is correct.

Some Global Positioning System (GPS) receivers are unused for substantial periods. For example, GPS receivers used in search and rescue operations, humanitarian missions, or stored in warehouses or on store shelves can go months or even years before use. During these idle periods, aging of the oscillator can cause the frequency of the oscillator to drift. When the oscillator drifts, the control signal that once produced the correct oscillator center frequency will produce a different oscillator center frequency and the window may no longer include the frequencies for acquiring GPS satellite signals. Consequently, the GPS receiver may be unable to acquire one or more of the GPS satellite signals. To correct this problem, GPS receivers must be taken out of service to undergo a calibration procedure at a depot or factory. Also, GPS receivers have a limited shelf-life because of oscillator drift. The limited shelf-life further increases costs, complicates logistics, and degrades reliability of GPS receivers.

Accordingly, it is desirable to provide a GPS receiver with recalibration that addresses one or more of the foregoing problems and other problems not expressly discussed in this background. In addition, it is desirable to provide methods of recalibrating a GPS receiver and methods for reconfiguring a GPS receiver for recalibration. Furthermore, it is desirable to provide a program product that can be used by a GPS receiver for recalibration or uploaded during the reconfiguring of a GPS receiver. Moreover, other desirable features and characteristics of the present invention will become apparent from the subsequent detailed description and the appended claims, taken in conjunction with the accompanying drawings and the foregoing technical field and background.

SUMMARY

A method for recalibrating a global positioning system (GPS) receiver is provided in accordance with an exemplary embodiment of the present invention. The method includes applying a first control signal to an oscillator for generation of an oscillator signal having an initial frequency and determining if an indicator of correct oscillator output frequency is present at the initial frequency. If an indicator of correct oscillator output frequency is not present, then iterative steps are followed until an indicator of correct oscillator output frequency is found. The iterative steps include: applying a new adjusted control signal to the oscillator for generation of a new frequency; determining whether an indicator of correct oscillator frequency is present; and if an indicator of correct oscillator output frequency is present with the oscillator having the new frequency, storing said adjusted control signal. If an indicator of correct oscillator frequency is present with the oscillator output signal having said initial frequency, then the initial control signal is stored.

A GPS receiver is also provided in accordance with the present invention. The GPS receiver includes an oscillator configured to generate an oscillator output signal, a mixer that is configured to receive an RF signal and convert that RF signal to at least one acquired GPS satellite signal using the oscillator output signal; and a controller coupled to said oscillator and to said mixer, said controller configured to implement a method including applying a first control signal to an oscillator for generation of an oscillator signal having an initial frequency and determining if an indicator of correct oscillator output frequency is present at the initial frequency. If an indicator of correct oscillator output frequency is not present, then iterative steps are followed until an indicator of correct oscillator output frequency is found. The iterative steps include: applying a new adjusted control signal to the oscillator for generation of a new frequency; determining whether an indicator of correct oscillator frequency is present; and if an indicator of correct oscillator output frequency is present with the oscillator having the new frequency, storing said adjusted control signal. If an indicator of correct oscillator frequency is present with the oscillator output signal having said initial frequency, then said initial control signal is stored.

In addition to the GPS receiver and the method for recalibrating a GPS receiver, a program product is provided in accordance with an exemplary embodiment of the present invention. The program product includes recalibration software executable in the processor of a GPS receiver for applying a first control signal to an oscillator for generation of an oscillator signal having an initial frequency and determining if an indicator of correct oscillator output frequency is present at the initial frequency. If an indicator of correct oscillator output frequency is not present, then iterative steps are followed until an indicator of correct oscillator output frequency is found. The iterative steps include: applying a new adjusted control signal to the oscillator for generation of a new frequency; determining whether an indicator of correct oscillator frequency is present; and if an indicator of correct oscillator output frequency is present with the oscillator having the new frequency, storing said adjusted control signal. If an indicator of correct oscillator frequency is present with the oscillator output signal having said initial frequency, then the initial control signal is stored. The program product also includes signal-bearing media bearing said recalibration software.

Furthermore, a method of reconfiguring a GPS receiver for recalibration is provided in accordance with an exemplary embodiment of the present invention. The method includes uploading a program into a memory of the GPS receiver that is executable by a processor of the GPS receiver. The program comprises recalibration software executable in the processor for applying a first control signal to an oscillator for generation of an oscillator signal having an initial frequency and determining if an indicator of correct oscillator output frequency is present at the initial frequency. If an indicator of correct oscillator output frequency is not present, then iterative steps are followed until an indicator of correct oscillator output frequency is found. The iterative steps include: applying a new adjusted control signal to the oscillator for generation of a new frequency; determining whether an indicator of correct oscillator frequency is present; and if an indicator of correct oscillator output frequency is present with the oscillator having the new frequency, storing said adjusted control signal. If an indicator of correct oscillator frequency is present with the oscillator output signal having said initial frequency, then the initial control signal is stored.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 2:
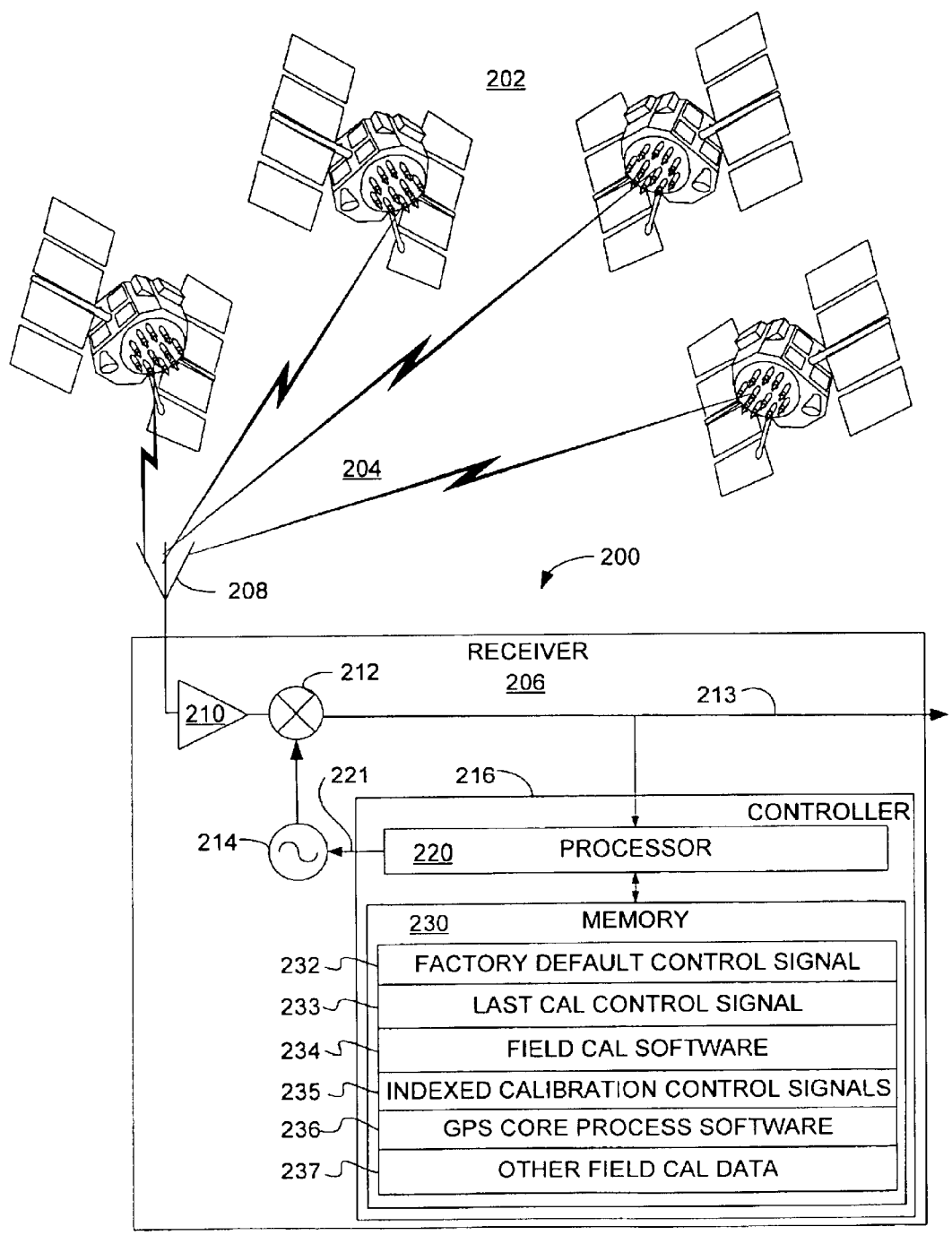
FIG. 2 is a block diagram of an exemplary OPS receiver in accordance with an exemplary embodiment of the present invention.

FIG. 2 shows a block diagram of an exemplary embodiment of a GPS receiver 206 configured for recalibration in accordance with an exemplary embodiment of the present invention. The GPS receiver 205 has an antenna 208 that is configured to receive GPS satellite output signals 204 from one or more GPS satellites 202. The antenna 208 is coupled to an amplifier 210 for increasing received signal strength. The output of the amplifier 210 includes amplified GPS satellite output signals 204 and the amplified GPS satellite output signals 204 are provided to a mixer 212 for mixing with the output signal of a local oscillator or oscillator 214, which produces one or more acquired GPS satellite signals 213. The GPS receiver 206 further includes a controller 216 coupled to the local oscillator 214 and configured to a supply control signal along a signal path 221 to the oscillator 214 that dictates the output frequency of the oscillator 214. The controller 216 is also coupled to the output of the mixer 212 for monitoring the presence or absence of acquired GPS signals 213.

The controller 216 may include a processor 220 coupled to a memory 230 configured to store field calibration software 234, a factory default control signal 232, and the last calibrated control signal 233. In one exemplary embodiment, the memory 230 may also be configured to store other data 237 that can be used to select control signals during recalibration, such as date of last calibration 237 and oscillator aging data 237. Those of skill in the art will appreciate still other data 237 that may be useful in field calibration, which may also be stored in memory 230.

Figure 3:
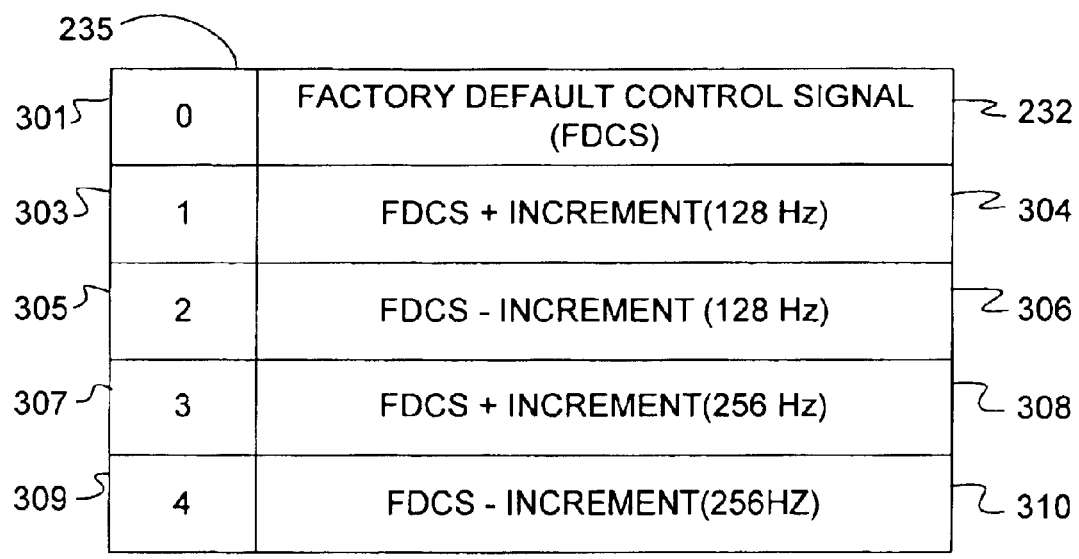
FIG. 3 is an indexed control signal table in accordance with an exemplary embodiment of the present invention.

In an exemplary embodiment, the memory 230 is configured to store an indexed table of control signals 235 including a minimum set of control signals 232, 304, 306, 308, and 310 that span the capability of the oscillator as shown in FIG. 3. The indexed table 235 preferably includes a factory default control signal 232 that produces an initial frequency, a second control signal 304 that originally produced a frequency equal to the initial frequency, a predetermined frequency increment, a third control signal 306 that originally produced a frequency equal to the initial frequency minus the frequency increment, a fourth control signal 308 that originally produced a frequency equal to the initial frequency plus twice the frequency increment, and a fifth control signal 30 that originally produced a frequency equal to the initial frequency minus twice the frequency increment. The frequency increment shifts the center frequency of the oscillator and the window centered upon the center frequency.

Figure 4:
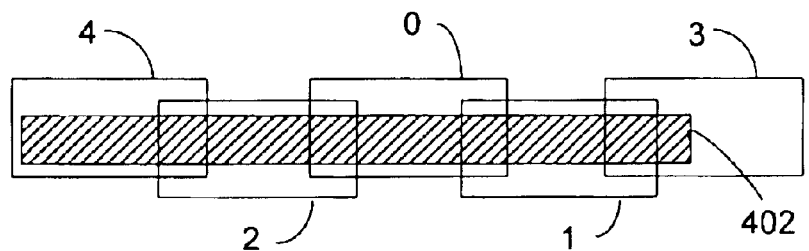
FIG. 4 illustrates overlapping frequency windows covering a bandwidth of an oscillator in accordance with an exemplary embodiment of the present invention.

The windows 0–4 preferably overlap as shown in FIG. 4 as a compensation for uncertainty in the difference between originally produced frequency increments and currently produced frequency increments. FIG. 4 shows a bandwidth 402 of an oscillator 214 and windows 0–4 corresponding to the windows created by the control signals 232, 304, 306, 308, or 310 having the same index number 301,303, 305, 307, or 309, respectively. A frequency increment of 128 Hz has been found useful in GPS receivers having +/–80 Hz windows. However, other values can be used in accordance with the present invention. The index values 301, 303, 305, 307, and 309 allow the field calibration software 234 to step through each control signal 232, 304, 306, 308, and 310 in sequence while searching for the correct control signal. Various search sequences, as understood by those of skill in the art, are contemplated within the invention.

Figure 1:
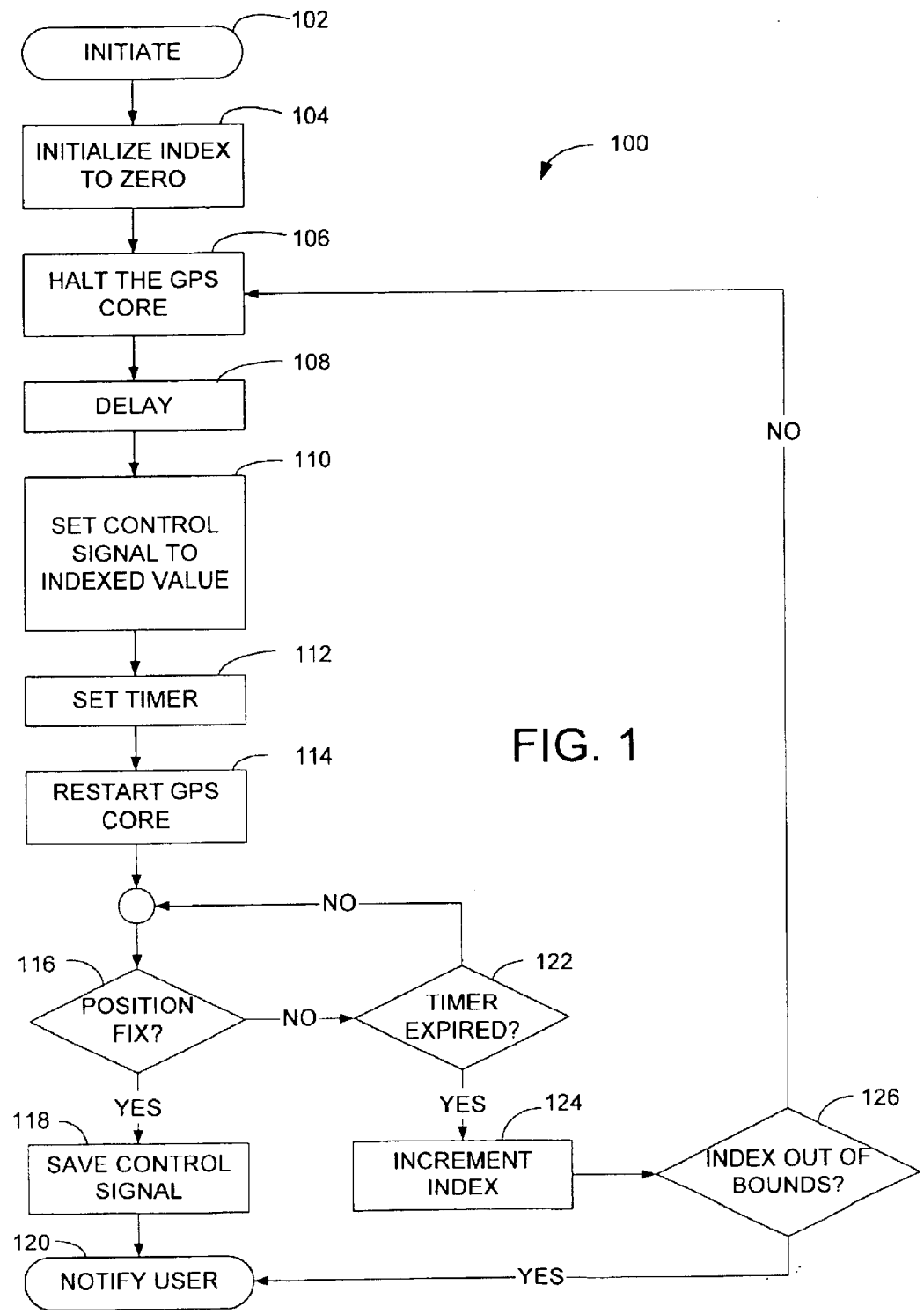
FIG. 1 is a flowchart of an exemplary method for recalibrating a GPS receiver in accordance with an exemplary embodiment of the present invention.

In accordance with one exemplary embodiment of the present invention, the controller 216 is configured to perform the method of recalibration of a GPS receiver as shown in FIG. 1. For example, the processor 220 of the controller 216 can be configured to access and execute the software 234 stored the memory 230 of the GPS receiver. Alternatively, any number of hardware, software or combination of hardware and software configurations of the controller 216 can be used to perform an exemplary method of recalibration of a GPS receiver such as that shown in FIG. 1.

Referring to FIG. 1, the process 100 is initiated in step 102. In an exemplary embodiment, process 100 may be initiated by an operator-supplied signal. For example, the operator may push a button or select an item from a displayed menu to initiate process 100 in step 102. Alternatively, the process 100 may be initiated automatically (i.e., without human intervention) in response to a particular event. For example, failure to acquire GPS signals 213 or a background timer reaching a predetermined time indicating an oscillator age of concern may initiate process 100 in step 102.

In step 104, an index in the field calibration software 234 is initialized to the value of the first-index 301 in the indexed table of control signals 235. For example, if the first table index 301 is zero, then the index in the field calibration software 234 is initialized to zero in step 104. Step 106 halts the running of GPS core process software 236, which inevitably is supplying an unsuccessful control signal 221 to the oscillator 214. Halting the GPS core process software 236 and later restarting it in step 114 allows a change in the control signal. Step 108 imposes a delay after halting the GPS core process software 236 in step 104. The delay provides deconstruction time for GPS core process software 236 objects. For example, a delay of about two (2) seconds may be imposed in step 108.

Step 110 sets the control signal on signal path 221 to the indexed value 232, 304, 306, 308, or 310. The first control signal that is set in step 110 is the first control signal in a tabulated search pattern of control signals. In an alternate embodiment, one or more of the control signals 232, 304, 306, 308, and 310, may be calculated in real time. Step 112 sets a timer that may later allow a time-out exit from the search loop 116-122-116 for each searched control signal 232, 304, 306, 308, and 310. The timer should be set for a period that will provide a favorable opportunity to acquire four GPS satellite signals given the known coverage pattern of the GPS satellite constellation. For example, the period of the timer set in step 112 may be about nine (9) minutes. Step 114 restarts the GPS core process software 236 with the new control signal 232, 304, 306, 308, or 310, thereby enabling the GPS receiver 206 to search a frequency window 0–4 of FIG. 4 centered on the new oscillator frequency produced in response to the new control signal. Step 116 determines if a GPS 3-D position fix (i.e., acquisition of four (4) GPS satellite signals) has occurred. Step 116 uses the 3-D position fix as the indicator that the oscillator output frequency is correct. However, other indicators may be used in accordance with the present invention. For example, a 2-D position fix or a single GPS satellite signal acquisition may be used as the indicator of a correct oscillator output frequency. In some embodiments, signals from software-accessible self-test points in the mixer may be suitable as indicators that the oscillator has the correct frequency. In yet other embodiments, a frequency meter may be coupled to the oscillator and the output of the meter read and compared to a stored correct value. If step 116 determines that no position fix has been acquired, then step 122 determines whether the timer set in step 112 has expired. If not, step 116 again determines whether a position fix has been acquired. The loop 116-122-116 continues until the timer set in step 112 expires or a position fix is acquired. Loop 116-122-116 may have a delay or dwell step (not shown) such that step 116 executes periodically. For example, step 116 may execute every sixteen (16) seconds during a timer period of nine (9) minutes.

If step 122 determines that the timer set in step 112 has expired, step 124 increments the index and step 126 determines if the new index 304, 306, 308, or 310 exceeds the bounds of the indexed table of control signals 235. If step 126 determines that the newly incremented index is out of bounds, a calibration failure exists and a user is preferably notified in step 120 of such a failure. The user may be further prompted, in step 120, to seek better sky access and retry the field calibration. If step 126 determines that the newly incremented index 304, 306, 308, or 310 is not out of bounds, then the GPS core process software 236 is halted in step 106 and the control signal testing loop 106-108-110-112-114-116-122-124-126-106 is reiterated to test the next newly indexed control signal 306, 308, or 310.

If step 116 detects a 3-D position fix, step 118 saves the currently indexed control signal 232, 304, 306, 308, or 310 in memory as the last calibration control signal 133. Step 120 notifies the user that the field calibration completed successfully. It will be understood that after the 3-D position fix, the automatic calibration that typically accompanies a 3-D position fix may further refine the control signal and save the refined version as the last calibration control signal 233 in memory 230.

Figure 5:
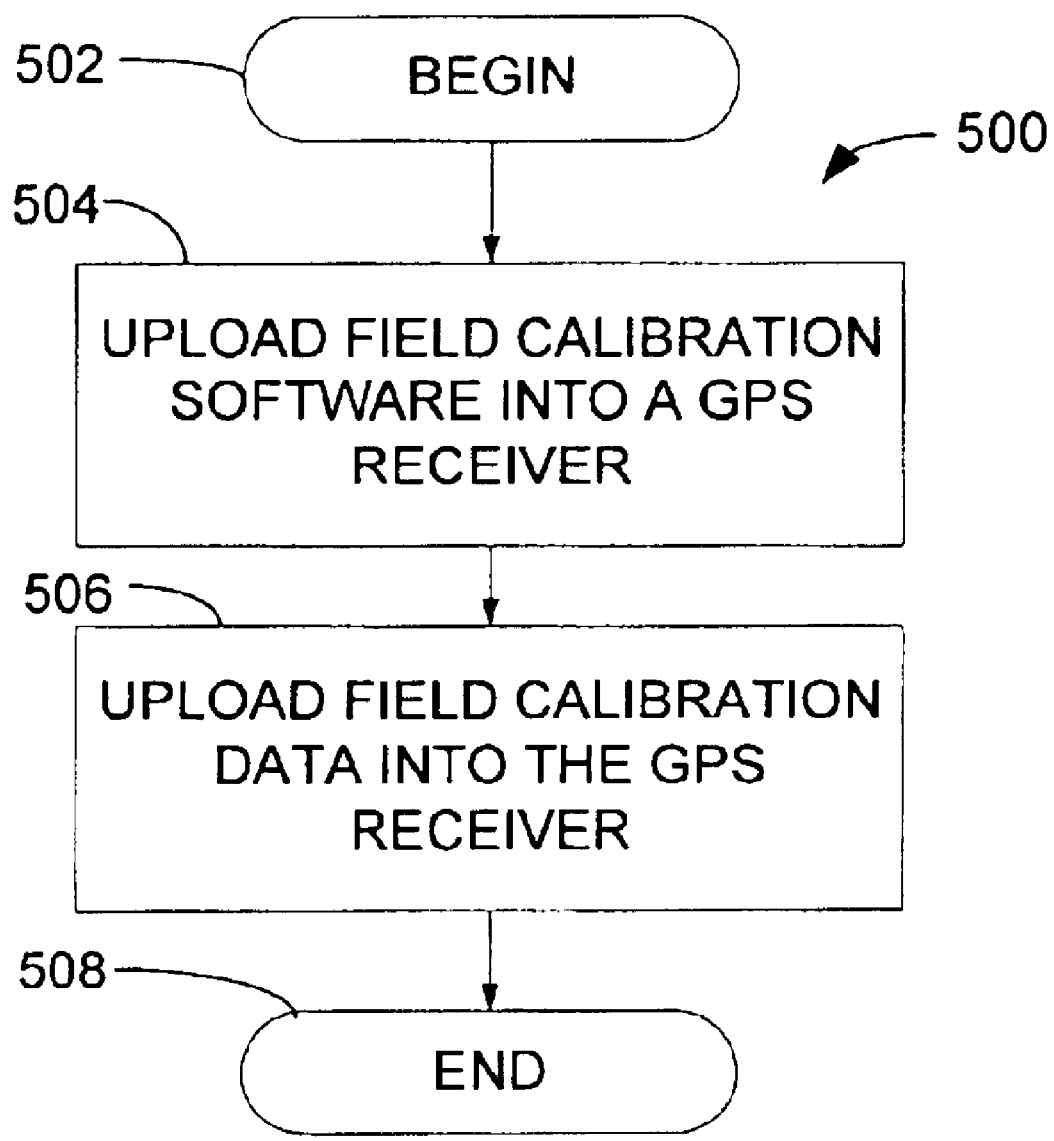
FIG. 5 is a flowchart of an exemplary method for reconfiguring a GPS receiver for recalibration in accordance with an exemplary embodiment of the present invention.

Certain GPS receivers are reprogrammable and therefore upgradeable. Reprogrammable GPS receivers typically have one or more I/O ports useful for uploading software and data. FIG. 5 shows a flowchart of an exemplary method 500 of reconfiguring a reprogrammable GPS receiver for recalibration in accordance with an exemplary embodiment of the present invention. The method 500 begins with step 502, which may include preparing the GPS receiver for reprogramming. For example, in a reprogrammable GPS receiver having a reprogramming mode, setting the mode to reprogramming mode would be included in step 502. Other preparatory steps for each specific GPS receiver are also preferably included in step 502. In step 504, the field calibration software 234 is uploaded into memory 230. The field calibration software 234 may contain a user interface portion for prompting the user to initiate calibration (step 102) and for informing the user of calibration progress (step 120). In step 506, field calibration data, such as a table of indexed control signals 235, a factory default control signal 232, a last calibration control signal 233, or other data supporting field calibration 237 is preferably uploaded into memory 230. In step 508, the reprogramming ends. Step 508 may include compiling the uploaded code and resetting the mode for normal operations. In some alternate embodiments, either of steps 504 and 506 may be omitted from process 500 and executed separately.

It should be understood that while the present invention is described here in the context of a fully functioning GPS receiver, those skilled in the art will recognize that the mechanisms of the present invention are capable of being distributed as a program product in a variety of forms and that the present invention applies equally regardless of the particular type of signal bearing media used to carry out the distribution. Examples of signal bearing media include: recordable media such as floppy disks, hard drives, memory cards, installed memory, and optical disks, and transmission media such as digital and analog communication links, including wireless communication links. Accordingly, field calibration software 234 may be made available for upload as a program product on any type of signal bearing media.

While at least one exemplary embodiment has been presented in the foregoing detailed description, it should be appreciated that a vast number of variations exist. For example, the method of the exemplary embodiment uses five discrete control signals to produce five discrete center frequencies in a preferred search sequence, but other search sequences, starting points, and different numbers of control signals are contemplated within the invention. For example, starting at the highest frequency of which the oscillator is capable and working a monotonic sequence of seven frequencies to the lowest frequency of which the oscillator is capable is included in the invention. It should also be appreciated that the exemplary embodiment or exemplary embodiments are only examples, and are not intended to limit the scope, applicability, or configuration of the invention in any way. For example, any method of determining that the control signal is producing the correct oscillator output frequency is contemplated within the present invention. The foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of recalibrating a Global Positioning System (GPS) receiver, the method comprising the steps of:

applying a first control signal to an oscillator of the GPS receiver for generation of an oscillator output signal having an initial frequency;

determining whether at least one indicator of a substantially correct oscillator output frequency is present in the GPS receiver with said oscillator output signal having said initial frequency; and if said at least one indicator of said substantially correct oscillator output frequency is not present in the GPS receiver with said oscillator output signal having said initial frequency, then iteratively performing the following steps until said at least one indicator of said substantially correct oscillator output frequency is present in the GPS receiver:

applying an adjusted control signal to said oscillator of the GPS receiver other than said first control signal and said adjusted control signal of a previous iteration for generation of said oscillator output signal having an adjusted frequency other than said initial frequency and said adjusted frequency of any previous iteration;

determining whether said at least one indicator of said substantially correct oscillator output frequency is present in the GPS receiver with said oscillator output signal having said adjusted frequency other than said initial frequency and said adjusted frequency of said previous iteration; and if said at least one indicator of said substantially correct oscillator output frequency is present in the GPS receiver with said oscillator output signal having said adjusted frequency other than said initial frequency and said adjusted frequency of said previous iteration, storing said adjusted control signal applied to said oscillator for generation of said oscillator output signal with said adjusted frequency; and if said at least one indicator of said substantially correct oscillator output frequency is present in the GPS receiver with said oscillator output signal having said initial frequency, then storing said initial control signal applied to said oscillator for generation of said oscillator output signal with said initial frequency.

2. The method of recalibrating the GPS receiver of claim 1, wherein said indicator of said substantially correct oscillator output frequency comprises acquisition of at least one GPS satellite signal.

3. The method of recalibrating the GPS receiver of claim 2, further comprising the step of discontinuing, after performing a predetermined number of iterations, the step of iteratively performing the following steps until said at least one GPS satellite signal is at least substantially acquired by the GPS receiver.

4. The method of recalibrating the GPS receiver of claim 2, further comprising the step of discontinuing, after expiration of a predetermined period, performance of the step of iteratively performing the following steps until said at least one GPS satellite signal is at least substantially acquired by the GPS receiver.

5. The method of recalibrating the GPS receiver of claim 2, wherein said at least one GPS satellite signal is a multi dimensional position fix.

6. The method of recalibrating the GPS receiver of claim 1, further comprising the step of selecting said first control signal, said adjusted control signal, and said adjusted control signal other than said first control signal and said adjusted control signal of said previous iteration from a predetermined sequence of control signals.

7. The method of recalibrating the GPS receiver of claim 6, wherein said predetermined sequence of control signals comprises said first control signal and a plurality of control signals offset from said first control signal by a predetermined offset.

8. The method of recalibrating the GPS receiver of claim 1, wherein said first control signal is based at least partially on a control signal selected during a previous calibration of the GPS receiver.

9. The method of recalibrating the GPS receiver of claim 1, wherein said step of applying a first control signal to said oscillator of the GPS receiver for generation of said oscillator output signal having said initial frequency is initiated without human intervention in response to a failure of the GPS receiver to acquire at least one GPS satellite signal within a predetermined period.

10. The method of recalibrating the GPS receiver of claim 1, further comprising the steps of:

discontinuing a core GPS process of the GPS receiver prior to said selecting said first control signal, said adjusted control signal, and said adjusted control signal other than said first control signal and said adjusted control signal of said previous iteration from a predetermined sequence of control signals; and initiating said core GPS process of the GPS receiver after said selecting said first control signal, said adjusted control signal and said adjusted control signal other than said first control signal and said adjusted control signal of said previous iteration from a predetermined sequence of control signals.

11. The method of recalibrating the GPS receiver of claim 1, wherein said at least one indicator of a substantially correct oscillator output frequency comprises a signal detected in said mixer.

12. The method of recalibrating the GPS receiver of claim 1, wherein said at least one indicator of a substantially correct oscillator output frequency comprises a signal detected in said oscillator.

13. A GPS receiver, comprising:

an oscillator configured to generate an oscillator output signal;

a mixer that is configured to receive an RF signal and convert said RF signal to at least one acquired GPS satellite signal with an application of said oscillator output signal; and a controller coupled to said oscillator and to said mixer, said controller configured to:

apply a first control signal to said oscillator for generation of said oscillator output signal with an initial frequency;

detect for at least one indicator of a substantially correct oscillator output signal during generation of said initial frequency; and if said at least one indicator of a substantially correct oscillator output frequency is not at least substantially detected with said oscillator output signal having said initial frequency, then iteratively perform the following steps until said at least one indicator of a substantially correct oscillator output frequency is at least substantially detected in the GPS receiver:

apply an adjusted control signal to said oscillator of the GPS receiver other than said first control signal and other than said adjusted control signal of a previous iteration for generation of said oscillator output signal with an adjusted frequency other than said initial frequency and other than said adjusted frequency of said previous iteration;

determine whether said at least one indicator of a substantially correct oscillator output frequency is at least substantially detected with said oscillator output signal having said adjusted frequency other than said initial frequency and other than said adjusted frequency of said previous iteration; and if said at least one indicator of a substantially correct oscillator output frequency is at least substantially detected with said oscillator output signal having said adjusted frequency other than said initial frequency and other than said adjusted frequency of said previous iteration, store said adjusted control signal applied to said oscillator for generation of said oscillator output signal with said adjusted frequency; and if said at least one indicator of a substantially correct oscillator output frequency is at least substantially detected with said oscillator output signal having said initial frequency, store said initial control signal applied to said oscillator for generation of said oscillator output signal with said initial frequency.

14. The GPS receiver of claim 13, wherein said indicator of a substantially correct oscillator output frequency comprises acquisition of at least one GPS satellite signal.

15. The GPS receiver of claim 14, wherein said controller is further configured to discontinue, after a predetermined number of iterations, the step to iteratively perform the following steps until said at least one GPS satellite signal is at least substantially acquired by the GPS receiver.

16. The GPS receiver of claim 14, wherein said controller is further configured to discontinue, after expiration of a predetermined period, the step to iteratively perform the following steps until said at least one GPS satellite signal is at least substantially acquired by the GPS receiver.

17. The GPS receiver of claim 14, wherein said at least one GPS satellite signal is a multi-dimensional position fix.

18. The GPS receiver of claim 13, wherein said controller is further configured to select said first control signal, said adjusted control signal, and said adjusted control signal other than said first control signal and said adjusted control signal of said previous iteration from a predetermined sequence of control signals.

19. The GPS receiver of claim 18, wherein said predetermined sequence of control signals comprises said first control signal and a plurality of control signals offset from said first control signal by a predetermined offset.

20. The GPS receiver of claim 13, wherein said controller is configured to select said first control signal based at least partially on a control signal selected during a previous calibration of the GPS receiver.

21. The GPS receiver of claim 13, wherein said controller is configured to initiate application of said first control signal to said oscillator of the GPS receiver for generation of said oscillator output signal having said initial frequency without human intervention in response to a failure of the GPS receiver to acquire at least one GPS satellite signal.

22. A program product for a GPS receiver having a processor, the program product comprising:

recalibration software executable in the processor to:

apply a first control signal to an oscillator of the GPS receiver for generation of an oscillator output signal having an initial frequency;

detecting for at least one indicator of a substantially correct oscillator output frequency is present in the GPS receiver with said oscillator output signal having said initial frequency; and if said at least one indicator of a substantially correct oscillator output frequency is not at least substantially detected by the GPS receiver with said oscillator output signal having said initial frequency, then iteratively perform the following steps until said at least one indicator of a substantially correct oscillator output frequency is at least substantially detected by the GPS receiver:

apply an adjusted control signal to said oscillator of the GPS receiver other than said fast control signal and said adjusted control signal of a previous iteration for generation of said oscillator output signal having an adjusted frequency other than said initial frequency and said adjusted frequency of said previous iteration;

determine whether at least one indicator of a substantially correct oscillator output frequency is at least substantially detected by the GPS receiver with said oscillator output signal having said adjusted frequency other than said initial frequency and said adjusted frequency of said previous iteration; and if said at least one indicator of a substantially correct oscillator output frequency is at least substantially detected by the GPS receiver with said oscillator output signal having said adjusted other than said initial frequency and said adjusted frequency of said previous iteration, store said adjusted control signal applied to said oscillator for generation of said oscillator output signal with said adjusted frequency; and if said at least one indicator of a substantially correct oscillator output frequency is at least substantially detected by the GPS receiver with said oscillator output signal having said initial frequency, then store said initial control signal applied to said oscillator for generation of said oscillator output signal with said initial frequency; and signal-bearing media bearing said recalibration software.

23. The program product for the GPS receiver having the processor of claim 22, wherein said at least one indicator of a substantially correct oscillator output frequency comprises acquisition of at least one GPS satellite signal.

24. The program product for the GPS receiver having the processor of claim 22, wherein said recalibration software is further executable in the processor to discontinue, after a predetermined number of iterations, said step to iteratively perform the following steps until said at least one indicator of a substantially correct oscillator output frequency is at least substantially detected by the GPS receiver.

25. The program product for the GPS receiver having the processor of claim 22, wherein said recalibration software is further executable in the processor to discontinue, after expiration of a predetermined period, said step to iteratively perform the following steps until said at least one GPS satellite signal is at least substantially acquired by the GPS receiver.

26. The program product for the GPS receiver having the processor of claim 22, wherein said at least one GPS satellite signal is a multi-dimensional position fix.

27. The program product for the GPS receiver having the processor of claim 22, wherein said recalibration software is further executable in the processor to select said first control signal, said adjusted control signal, and said adjusted control signal other than said first control signal and said adjusted control signal of said previous iteration from a predetermined sequence of control signals.

28. The program product for the GPS receiver having the processor of claim 22, wherein said predetermined sequence of control signals comprises said first control signal and a plurality of control signals offset from said first control signal by a predetermined offset.

29. The program product for the GPS receiver having the processor of claim 22, wherein said first control signal is based at least partially on a control signal selected during a previous calibration of the GPS receiver.

30. The program product for the GPS receiver having the processor of claim 22, wherein said recalibration software is further executable in the processor to initiate application of said first control signal to said oscillator of the GPS receiver for generation of said oscillator output signal having said initial frequency without human intervention in response to a failure of the GPS receiver to acquire said at least one GPS satellite signal.

31. The program product of claim 22, wherein said signal-bearing media comprises transmission media.

32. The program product of claim 22, wherein said signal-bearing media comprises recordable media.

33. A method of reconfiguring a GPS receiver for recalibration, comprising the steps of:
uploading a program into a memory of the GPS receiver that is executable by a processor of the GPS receiver, said program comprising:
recalibration software executable in the processor to:
apply a first control signal to an oscillator of the GPS receiver for generation of an oscillator output signal having an initial frequency;
detect for at least one indicator of a substantially correct oscillator output frequency in the GPS receiver with said oscillator output signal having said initial frequency; and
if said at least one indicator of a substantially correct oscillator output frequency is not at least substantially detected in the GPS receiver with said oscillator output signal having said initial frequency, then iteratively perform the following steps until said at least one indicator of a substantially correct oscillator output frequency is at least substantially detected in the GPS receiver:

apply an adjusted control signal to said oscillator of the GPS other than said first control signal and said adjusted control signal of a previous iteration for generation said oscillator output signal having an adjusted frequency other than said initial frequency and said adjusted frequency of said previous iteration;

determine whether at least one indicator of a substantially correct oscillator output frequency is at least substantially detected in the GPS receiver with said oscillator output signal having said adjusted frequency other than said initial frequency and said adjusted frequency of said previous iteration; and if said at least one indicator of a substantially correct oscillator output frequency is at least substantially detected in the GPS receiver with said oscillator output signal having said adjusted other than said initial frequency and said adjusted frequency of said previous iteration, store said adjusted control signal applied to said oscillator for generation of said oscillator output signal with said adjusted frequency; and if said at least one indicator of a substantially correct oscillator output frequency is at least substantially detected in the GPS receiver with said oscillator output signal having said initial frequency, then store said initial control signal applied to said oscillator for generation of said oscillator output signal with said initial frequency; and said program uploaded from signal-bearing media bearing said recalibration software; and uploading field calibration data into said memory of the GPS receiver that is accessed by said processor during execution of said program by said processor of the GPS receiver.

34. The method of reconfiguring a GPS receiver for recalibration of claim 33, wherein said indicator of a substantially correct oscillator output frequency comprises acquisition of a GPS satellite signal.

\* \* \* \* \*

UNITED STATES PATENT AND TRADEMARK OFFICE
CERTIFICATE OF CORRECTION

PATENT NO. : 6,771,212 B1
DATED : August 3, 2004
INVENTOR(S) : David Moon Yee et al.

It is certified that error appears in the above-identified patent and that said Letters Patent is hereby corrected as shown below:

<u>Title page,</u>
Item [73], Assignee, delete "Dynamcis" and add -- Dynamics --.

Signed and Sealed this

Twenty-first Day of December, 2004

JON W. DUDAS
*Director of the United States Patent and Trademark Office*